United States Patent
Cusack, Jr.

(10) Patent No.: US 8,624,733 B2
(45) Date of Patent: Jan. 7, 2014

(54) DEVICE FOR ELECTRONIC ACCESS CONTROL WITH INTEGRATED SURVEILLANCE

(76) Inventor: Francis John Cusack, Jr., Groton, MA (US)

( * ) Notice: Subject to any disclaimer, the term of this patent is extended or adjusted under 35 U.S.C. 154(b) by 740 days.

(21) Appl. No.: 12/261,201

(22) Filed: Oct. 30, 2008

(65) Prior Publication Data

US 2009/0115570 A1    May 7, 2009

Related U.S. Application Data

(60) Provisional application No. 61/001,544, filed on Nov. 5, 2007.

(51) Int. Cl.
  *G08B 13/00*    (2006.01)
  *G08B 13/08*    (2006.01)
  *G08B 19/00*    (2006.01)
  *E05B 45/06*    (2006.01)
  *G05B 19/00*    (2006.01)
  *G06K 9/00*     (2006.01)
  *H04N 7/18*     (2006.01)

(52) U.S. Cl.
  USPC ......... 340/541; 340/545.1; 340/542; 340/5.1; 340/5.2; 382/103; 348/61

(58) Field of Classification Search
  USPC .............................. 340/540, 541; 375/240.01
  See application file for complete search history.

(56) References Cited

U.S. PATENT DOCUMENTS

| | | | |
|---|---|---|---|
| 6,570,498 B1 * | 5/2003 | Frost et al. ............... | 340/540 |
| 6,696,945 B1 * | 2/2004 | Venetianer et al. ........... | 340/541 |
| 6,917,902 B2 * | 7/2005 | Alexander ................... | 702/189 |
| 6,972,660 B1 * | 12/2005 | Montgomery et al. ...... | 340/5.52 |
| 2002/0094111 A1 * | 7/2002 | Puchek et al. ................ | 382/115 |
| 2003/0190076 A1 * | 10/2003 | DeLean ........................ | 382/209 |
| 2004/0240542 A1 * | 12/2004 | Yeredor et al. ........... | 375/240.01 |
| 2005/0219360 A1 | 10/2005 | Cusack et al. | |
| 2007/0291118 A1 | 12/2007 | Shu et al. | |
| 2008/0218591 A1 | 9/2008 | Heier et al. | |
| 2008/0273088 A1 | 11/2008 | Shu et al. | |

OTHER PUBLICATIONS

VideoIQ® iCVR™; The World's First Network Camera with Built-in Intelligent Detection, Object Search and Content Aware Storage; 6 pages; Bedford, MA, USA.

HID Access; "EdgeReader™ ERP40—IP Intelligence at the Door with Integrated multiCLASS™ Reader for Host Systems 82125B"; Assa Abloy Group; Mar. 2008.

* cited by examiner

*Primary Examiner* — Steven Lim
*Assistant Examiner* — Pameshanand Mahase
(74) *Attorney, Agent, or Firm* — Schmeiser, Olsen & Watts LLP

(57) ABSTRACT

Described is a device for electronic access control (EAC) and surveillance. The device includes an EAC module and an imager integrated in a single unit. The EAC module controls physical access through a secure portal and the imager maintains surveillance of an observation area near the portal. A data signal is provided at a data port proximate to the EAC module and imager. The data signal includes EAC data for the portal, image or video data of the observation area and optional audio data. The device can be configured to communicate with a remote server and database over an IP data network. The device can also include one or more analytical modules for real-time computation and processing of data and generation of metadata for transmission over the data network. Correlating and combining current and historical data from multiple devices results in powerful real time threat detection and forensic search capability.

19 Claims, 10 Drawing Sheets

Integrated EAC & CCTV IP Device with On Board Video and Data Storage

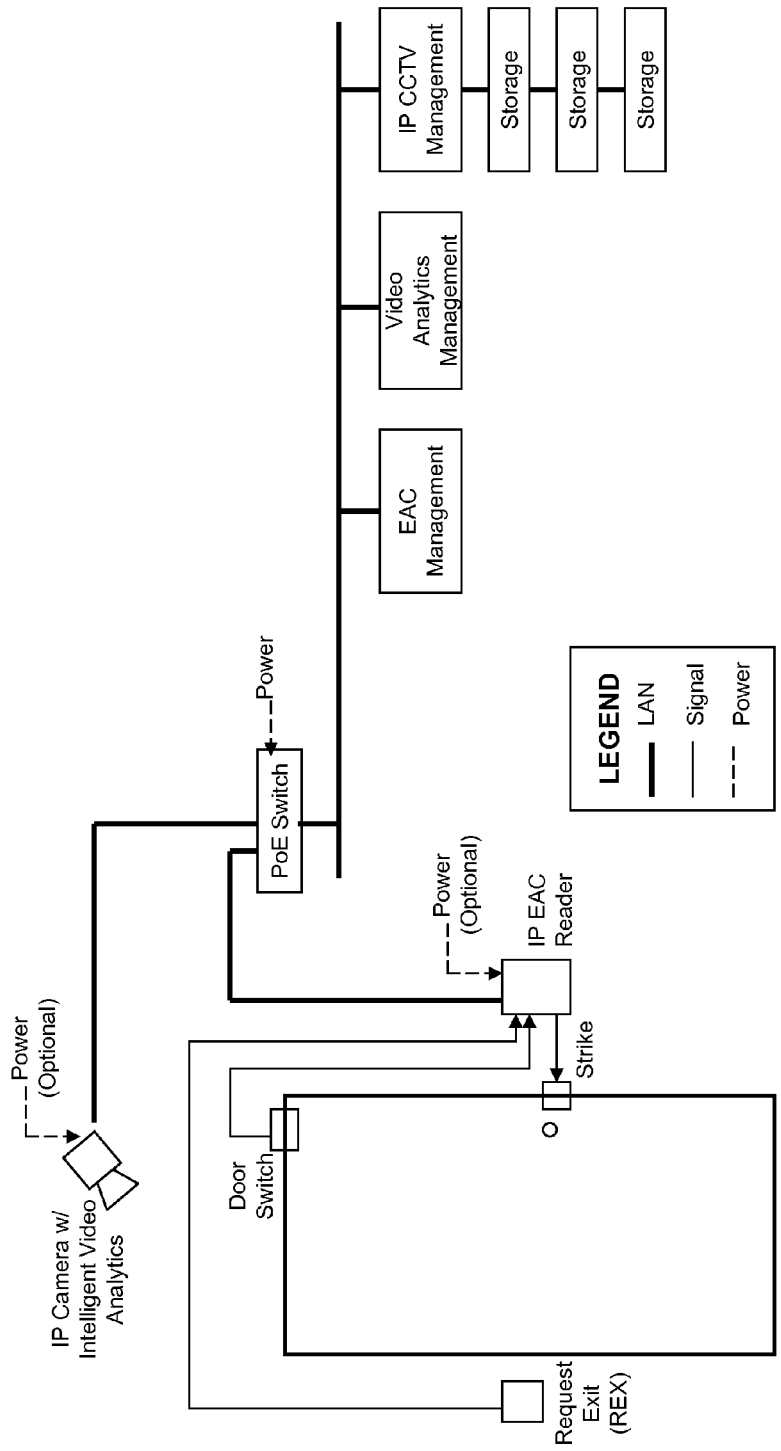

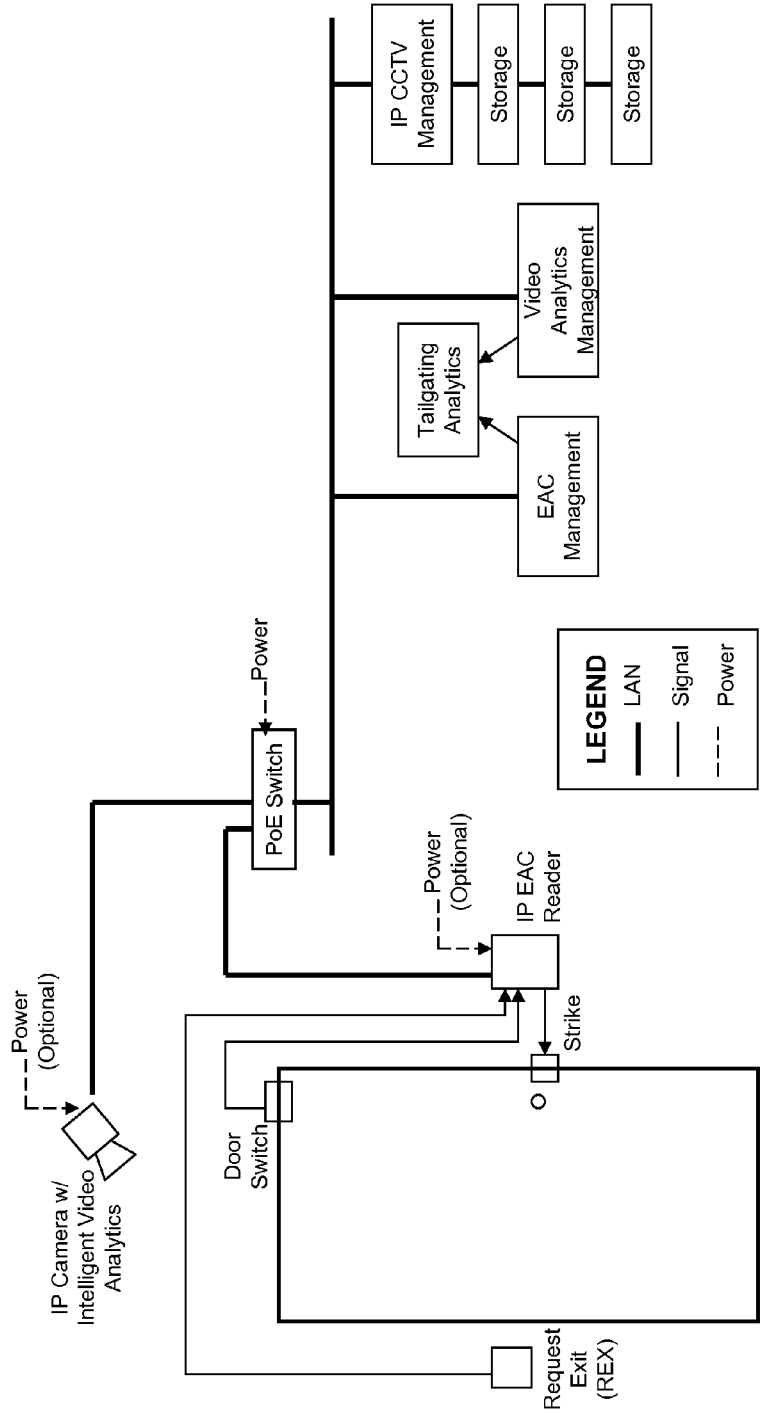

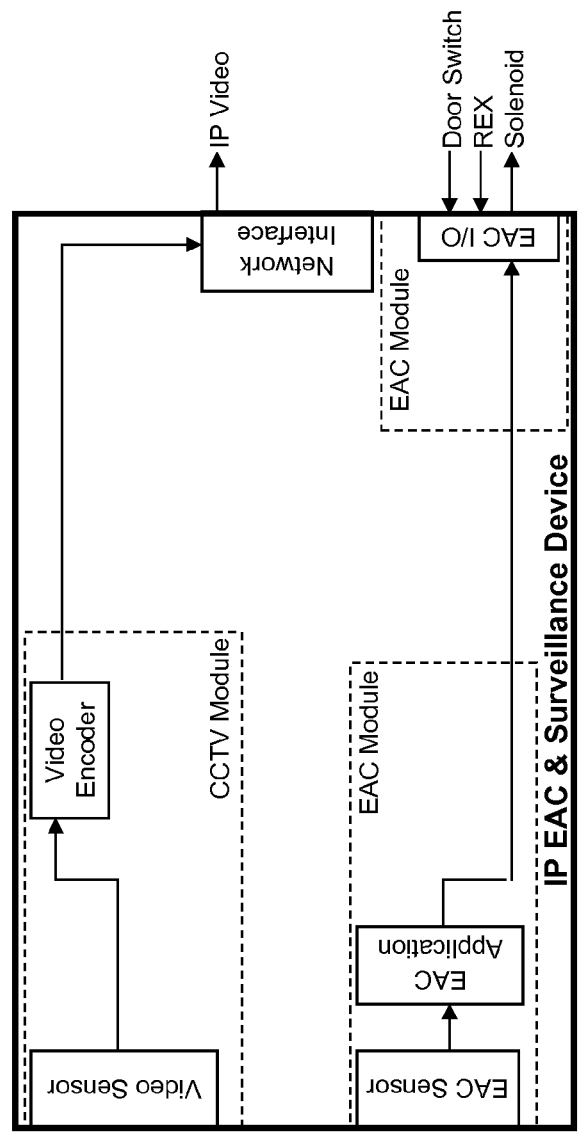
Figure Three
*IP Device with Integrated EAC and CCTV Surveillance Capabilities*

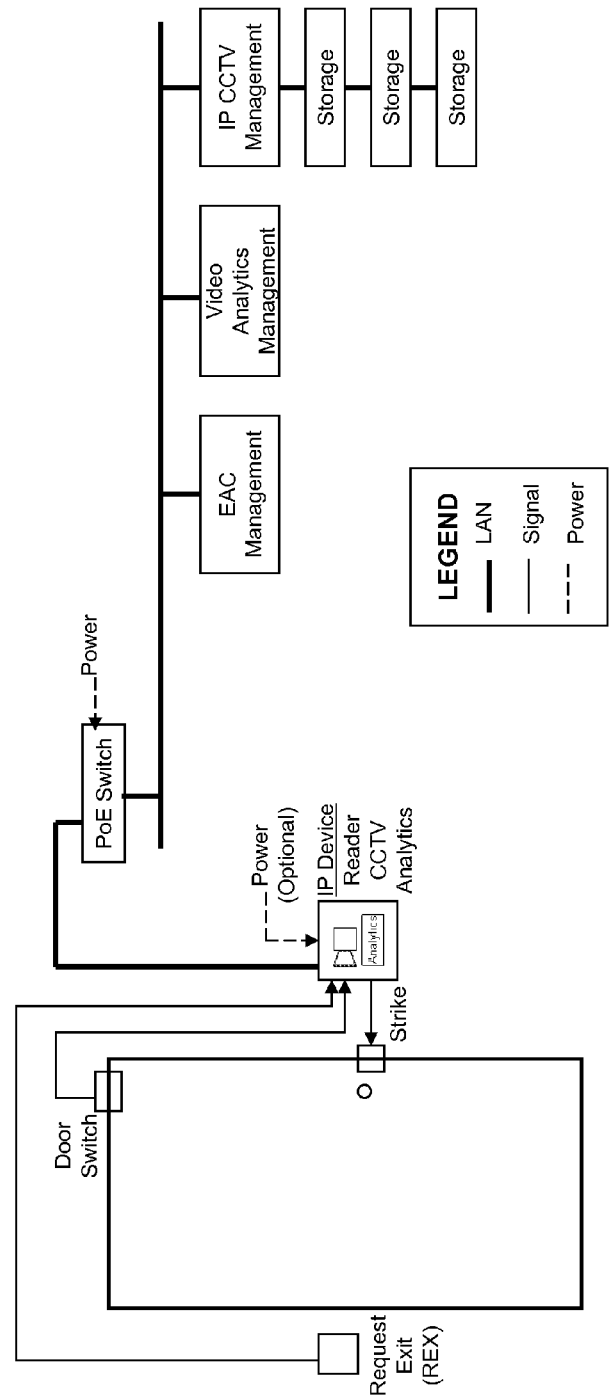

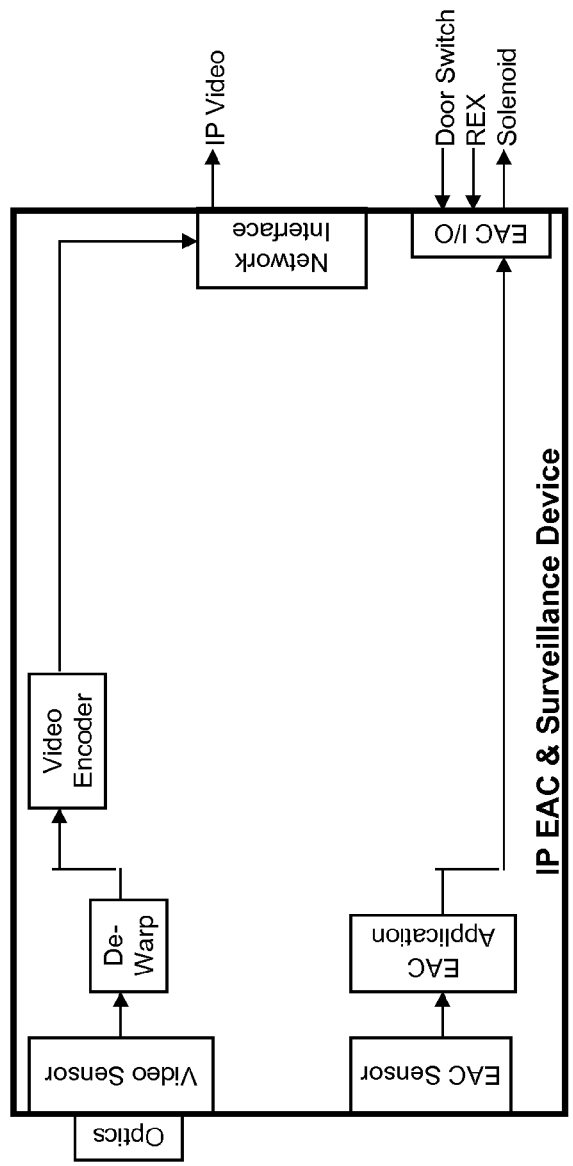
Figure Five
Integrated EAC & CCTV IP Device with Immersive Imaging and De-Warping Capability

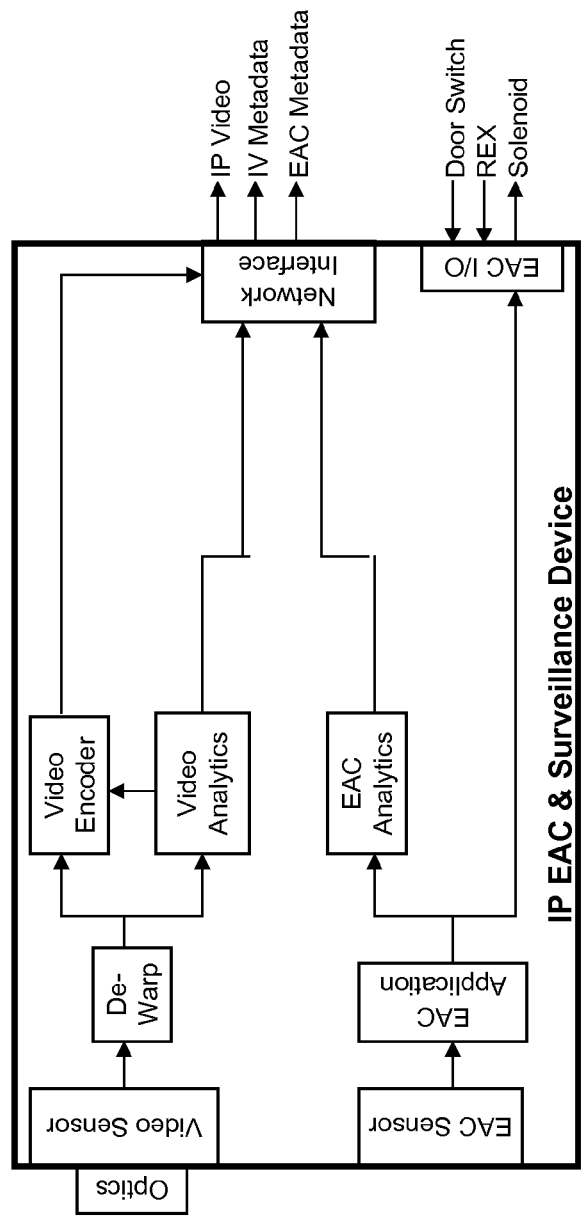
Figure Six
Integrated EAC & CCTV IP Device with On Board EAC and CCTV Analytics

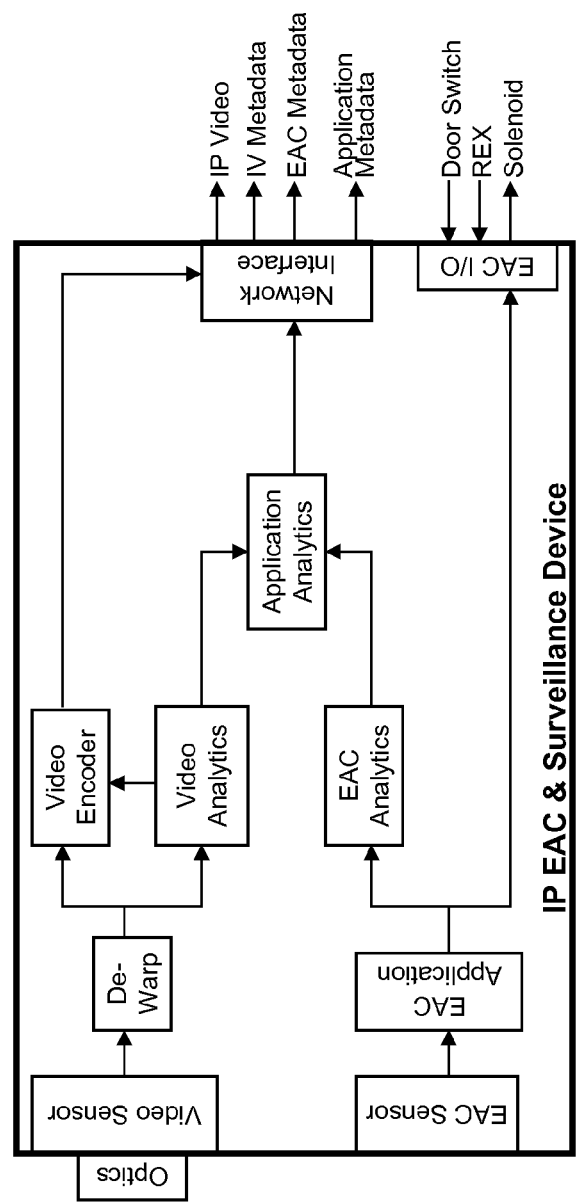
Figure Seven
Integrated EAC & CCTV IP Device with On Board Fused Application Analytics

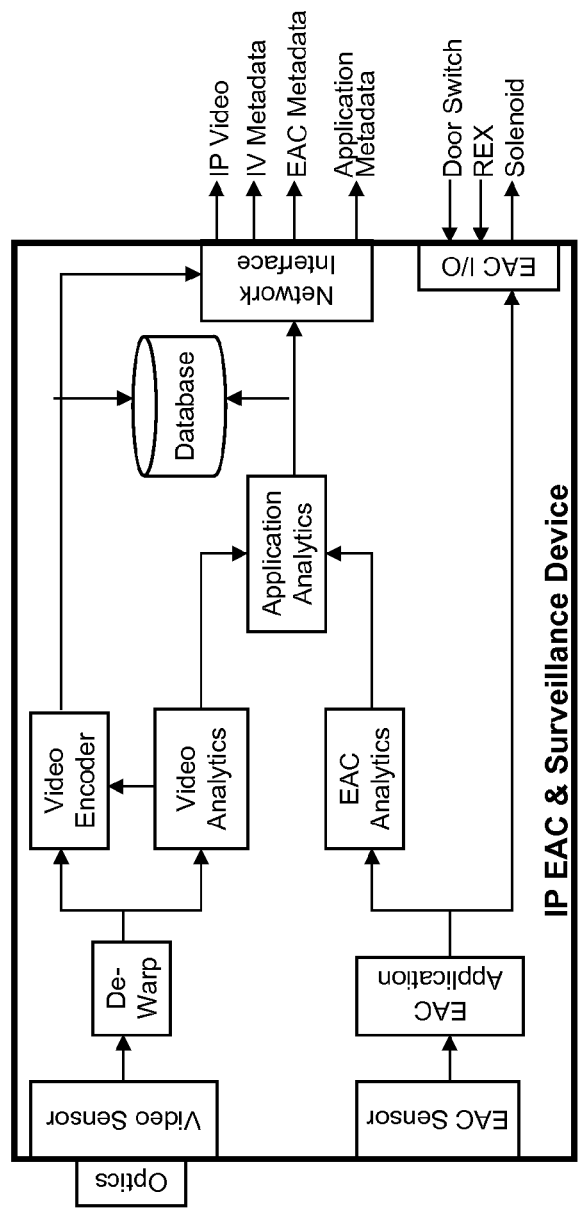

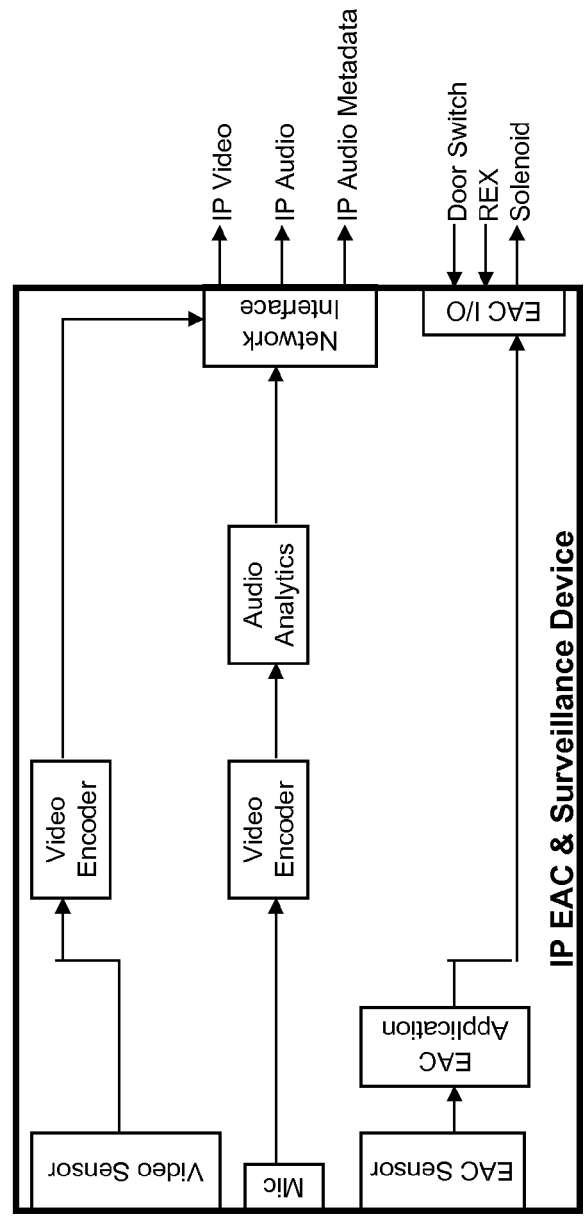
Figure Nine
Integrated EAC & CCTV IP Device with Microphone and VoIP

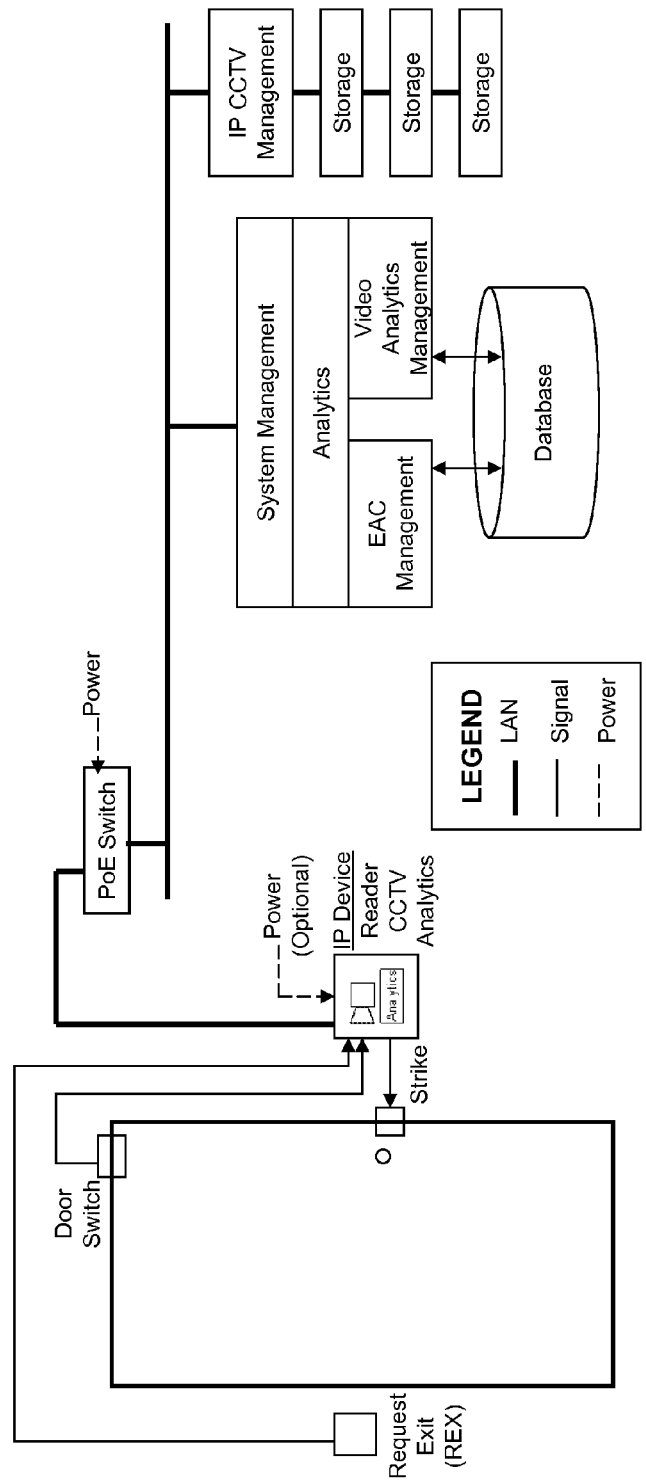
Figure Ten
Back End Management and Analytics

DEVICE FOR ELECTRONIC ACCESS CONTROL WITH INTEGRATED SURVEILLANCE

RELATED APPLICATION

This application claims the benefit of the earlier filing date of U.S. Provisional Patent Application Ser. No. 61/001,544, filed Nov. 5, 2007, titled "Method and Apparatus for Electronic Access Control Device with Integrated Surveillance," the entirety of which is incorporated herein by reference.

FIELD OF THE INVENTION

The present invention relates generally to the fields of electronic physical access control and digital video surveillance, and specifically relates to the combination and integration of the two within a single IP addressable device. The invention also relates to the fields of access control analytics and video analytics operating within same device both independently and cooperatively with higher level analytical applications.

BACKGROUND OF THE INVENTION

Electronic Access Control (EAC) and Closed Circuit Television (CCTV) surveillance systems have historically coexisted throughout secure installations as two functionally separate and non-communicative systems. EAC systems are designed and operated solely for the purpose of controlling physical access in to and out of secure areas. Historically the functionality has been segregated amongst several disparate components such as an input device located at the non-secure side of the portal, a field panel on the secure side that services several input devices, and a centrally located server for enrollment, administration and storage functions and cables to interconnect them.

Input devices may prompt the user attempting to gain access for one or more of the following; what you know (e.g. PIN or code), what you have (access card with magnetic strip or radio frequency [RF] proximity code) or who you are (biometric signal e.g. fingerprint or iris pattern). The communication infrastructure for EAC systems has historically followed a serial protocol (RS422 & RS485) but recently a new generation of systems has been introduced based on IP protocol and Ethernet thereby ushering in a new age of information technology (IT) with all its associated benefits. Video based surveillance systems are used to either present a live video feed to an operator (guard) for real time monitoring and response, or to feed video to storage devices (e.g. Digital Video Recorders [DVR]) for forensic review in support of post event investigation. Surveillance systems are comprised of cameras that image the area of interest and until recently output analog video (NTSC or PAL) over coaxial cables to carry the analog video signals, and video monitors and storage devices (DVRs). Like their EAC counterpart, surveillance system configuration and infrastructure has remained unchanged for decades until recently. State of the art surveillance systems are now wholly digital configurations and like EAC systems are based on IP protocols and Ethernet. Cameras produce a digital video stream (e.g. MPEG4 & H.264) that travels over network infrastructure (e.g. CAT5 or CAT6) to a digital video storage, retrieval and management system (e.g. Network Video Recorder [NVR]). Devices at the network edge (referred to as "edge device") such as IP cameras and IP card readers may also be powered by the CAT5/6 cable when operated from a Power Over Ethernet (PoE) switch, thereby eliminating the need for an external power supply at the edge device. The state of the art configurations for IP EAC and IP CCTV video are shown in Figure One.

The common driver of the device and infrastructure transformation from analog to IP/digital is one of cost. Cost savings are realized through lower total cost of ownership by leveraging existing IT assets and know how, lower cost of installation due to a reduced number of system components, and eventually lower costs for the digital devices.

EAC and CCTV are often operational within proximity to each other, but not in a complementary fashion. For example a camera dome is often mounted in the ceiling of a corridor to surveil a hallway including the areas around one or more EAC doors. State of the art consists of two discrete systems that do not cooperate or communicate.

For well defined problems traditional EAC and CCTV systems have been combined with the aid of the emerging technology of intelligent video analytics, also known as intelligent video (IV). State of the art IV systems are located at the back end of the EAC and CCTV configurations and tie together the real time data from the EAC server and the CCTV management system as shown in Figure Two.

For example, a tailgating violation (two or more persons pass through a secure door following a single valid access event) may be automatically detected, given properly located EAC and CCTV, by applying intelligence to the timing of events produced by the EAC and CCTV systems. The CCTV video shows the time and number of people passing through the door while the state of the various EAC sensors reveal time of card swipe and time door was opened and closed. Through automated analysis of the video stream to detect and report the number of people passing through the door and reconciliation with the state of the EAC sensors, it may accurately be determined if a tailgating violation has occurred. The IV algorithms typically require a dedicated processing platform to the support the computationally intensive task of simultaneously analyzing and correlating the EAC and CCTV data and annunciating a breech of tailgating policy.

SUMMARY OF THE INVENTION

In one aspect, the invention features a device for electronic access control and surveillance. The device includes an EAC module, and imager and a data port. The EAC module controls physical access through a portal between a secure area and a non-secure area, and generates access control data. The imager performs surveillance of an observation area proximate to the portal and generates image data and/or video data. The data port is disposed proximate to and is electrically coupled to the EAC module and the imager. The device provides at the data port a data signal comprising EAC data for the portal and at least one of image data and video data of the surveilled observation area.

In another aspect, the invention features a device for electronic access control and surveillance. The device includes an EAC module, an imager, an analytics module and a data port. The EAC module controls physical access through a portal between a secure area and a non-secure area, and generates access control data. The imager performs surveillance of an observation area proximate to the portal and generates video data. The analytics module is in electrical communication with the EAC module or the imager and receives the access control data or the video data, respectively. The analytics module generates metadata in response to the received data. The data port is disposed proximate to and is in electrical communication with the analytics module and at least one of the EAC module and the imager. At the data port the device provides a data signal that includes metadata from the analytics module and at least one of EAC data for the portal and video data of the surveilled observation area.

In yet another aspect, the invention features a system for electronic access control and surveillance. The system includes a device for electronic access control and surveillance, a remote database and a server. The device for electronic access control includes an EAC module, an imager and a data port. The EAC module controls physical access through a portal between a secure area and a non-secure area, and generates access control data. The imager performs surveillance of an observation area proximate to the portal and generates at least one of image data and video data. The data port is disposed proximate to and is electrically coupled to the EAC module and the imager. The device provides at the data port a data signal that includes EAC data for the portal and at least one of image data and video data of the surveilled observation area. The remote database is configured for communication with the data port of the device through an intervening data network and is also configured to store the EAC data for the portal and at least one of image data and video data of the surveilled observation area. The server is in communication with the remote database and is configured to process the EAC data for the portal and at least one of image data and video data of the surveilled observation area. The server generates analytical data in response to the processed data.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

Figure One: State of the Art IP Electronic Access Control and CCTV Configuration Figure Two: State of the Art Tailgating Analytics Configuration Figure Three: IP Device with Integrated EAC and CCTV Surveillance Capabilities Figure Four: Invention's IP Electronic Access Control and CCTV Configuration Figure Five: Integrated EAC & CCTV IP Device with Immersive Imaging and De-Warping Capability Figure Six: Integrated EAC & CCTV IP Device with On Board EAC and CCTV Analytics Figure Seven: Integrated EAC & CCTV IP Device with On Board Fused Application Analytics Figure Eight: Integrated EAC & CCTV IP Device with On Board Video and Data Storage Figure Nine: Integrated EAC & CCTV IP Device with Microphone and VoIP Figure Ten: Back End Management and Analytics

DETAILED DESCRIPTION

The invention presented herein is for a next generation security device that integrates the functionality of EAC and CCTV into a single IP addressable device. Furthermore, analytics, such as intelligent video and application analytics, can also be integrated to fully exploit the fusion of EAC and CCTV data. The introduction of access control analytics, which has never been done before, and the combination of same EAC analytics with CCTV analytics through higher level application analytic programs provides significant advantages over current state of the art devices. By combining these capabilities in one IP device located at the network edge, the computationally intensive operations occur in real time on the highest quality data yielding the highest performance for analytical algorithms. This invention provides for a degree of situational awareness around the secure door area that is unprecedented. The invention provides for manual and automated detection and observation of all events, and is able to associate, correlate and combine data back through time and from door to door for a powerful real time threat detection and forensic search capability.

The device form factor will look and function like a state of the art IP EAC device, and will provide means for users wishing to gain access to assert one or a combination of: what they have, what they know or who they are. The device will also house an integrated CCTV camera and IP video processor for digital video surveillance and IV applications. The device may operate in solely EAC mode as an IP EAC device, solely in surveillance mode as an IP camera, or both modes simultaneously.

Each operational mode may be enhanced by analytics resident on the device. EAC analytics may be applied to EAC transactional data to produce and analyze statistics of EAC log data to reveal subtle but ominous usage patterns that may portend a looming threat. Intelligent video analytics may be applied to CCTV data to automatically characterize activity within surveillance area such as number and type of objects (people, carts . . . ), object location, speed and direction, etc. This video understanding supports video based behavior recognition and the automatic detection of slip and fall, loitering, crowd formation and dispersal, among others. Furthermore, this IV module may provide a feedback signal to the IP video module to effect real time control of video frame and compression parameters, thereby minimizing network bandwidth consumption while ensuring high quality video for priority events.

Higher level application analytics may be applied to both EAC and IV analytic modules to detect specific events such as human tailgating which requires the combination of both EAC and IV analytic data.

The device may output unique and separate data streams for each of the EAC, CCTV and application functions, or may output metadata that captures all relevant data into a single message. IP video produced by device will be associated with EAC, IV and application event data.

Integrated EAC and CCTV IP Device

The preferred embodiment of the invention consists of a form factored IP addressable device supporting EAC and CCTV functions. It is envisioned that the device is located adjacent to a door for which physical access is to be controlled in a fashion entirely consistent with state of the art IP addressable EAC input devices. Ideally the device has only one power and data connection, namely an RJ45 jack to connect to a network, several input connections to sense peripheral door sensors such as status of door contact switch and an output connection to energize the door strike. In this embodiment power is supplied to the IP device via Power over Ethernet (PoE) provided an appropriate PoE switch is used in conjunction with the device. Alternatively the device may receive power from an external source.

In its simplest configuration, the device is comprised of an EAC module, a CCTV module and a network interface module as shown in Figure Three. The EAC module replicates the functionality of a state of the art IP EAC system and contains all necessary components to accept, verify, adjudicate, actuate and record access requests. The EAC module is comprised of a sensor for reading a user's asserted identity (e.g. magnetic strip or RF proximity), an EAC application to verify, adjudicate and log access requests, processor, database and an EAC Input/Output (I/O) module to read in status of auxiliary signals (e.g. door switch status) and actuate the door solenoid.

The CCTV module emulates the functionality of an IP camera operating in a traditional surveillance model. The module is comprised of a video sensor, control electronics to condition and optimize the video and an encoder to translate the analog video signal into a digital video stream that is suitable for transmission over the network (e.g. MPEG4, MJPEG, H.264), display and storage on a network video recorder. The video sensor may be any type that produces an image such as CCD or CMOS, and may produce video in any spectrum (e.g. visible, near infrared . . . ).

The network module conditions and manages all incoming and outgoing data and video consistent with network operation.

Independent Operational Mode

The consolidation of the EAC and CCTV functions into a single IP device at the network edge as shown in Figure Four vastly simplifies the configuration over that of the two systems operating independently. In this simplest configuration, the two functions of EAC and CCTV may operate independently. The device may operate in solely EAC mode, solely CCTV mode, or both active together. While there are benefits to combining the data produced from each subsystem, independent operation is equally legitimate.

In EAC mode, the EAC subsystem will read an input (card, PIN, biometric), adjudicate and either grant or deny access. In either case an event log will be created and either stored locally, sent as a message back to a central server, or both. The event log will be consistent with state of the art IP EAC devices, and record access event time, door number, card or PIN identifier, biometric based user ID, door open time and duration, etc. If access is granted, the IP device may either actuate the door directly provided there is enough power available or send a signal to a relay to actuate the door solenoid.

In CCTV mode the device output will be IP video of the door area consistent with traditional IP camera operation. Video can be streamed continuously or intermittently at pre-determined fixed video frame and compression rates in compliance with surveillance policy.

Integrated EAC and CCTV IP Device with Immersive Imaging Surveillance

Sensor head and lens selection provides the flexibility to surveil a small area or an entire hemispherical area. State of the art multi-megapixel imagers furnish sufficient spatial resolution to make a single camera feasible for wide area coverage. Alternatively two or more cameras may be used. Resident hardware and software may be used to de-warp the distorted image produced by optics designed to surveil a wide area to render a more conventional landscape image in real time (Figure Five). Door area video will be passed to a resident compression engine and then streamed over the network consistent with IP camera operation. Video will be available for real time monitoring and/or storage.

Integrated EAC and CCTV IP Device with EAC and IV Analytics

Analytics represent a powerful adjunct capability to traditional EAC and CCTV systems. While logical access control systems have seen analytics used to detect vulnerabilities and subtle attacks to the network integrity grow to a billion dollar industry, analytics has yet to reach physical EAC systems. CCTV has recently seen intelligent video analytics begin to gain traction and acceptance but is very much in its infancy. The application of EAC and CCTV analytics within the IP device presented herein is a natural and powerful extension of the invention. EAC analytics and CCTV analytics may run on the EAC and CCTV data paths respectively as shown in Figure Six.

Resident EAC analytics may enhance EAC efficacy by collecting and analyzing statistical data of EAC events for the door in question. Searching for event data patterns and trends may provide insight to systemic policy breeches and through extrapolation of statistical trends may even predict the probability of policy breeches yet to occur.

Resident CCTV analytics will continuously monitor the area surrounding the door for specific behaviors. State of the art CCTV analytics are able to detect: people counting, slip and fall, crowd formation and dispersion, running, traveling in an unauthorized direction, and erratic behavior among others. Some or all of these behaviors and new ones can be preset to run within the presented invention continuously or can be instantiated in response to CCTV, EAC or external sensor input.

Independent Operational Mode with EAC and IV Analytics

The EAC analytics will produce metadata and alerts based on analysis of real time and historical access attempts in compliance with pre-determined criteria.

Analytics is particularly well suited to the video sensor. State of the art IP cameras do have rudimentary on board IV analytics, but to date no EAC device with integral camera does. The CCTV analytics will produce metadata and alerts based on pre-determined IV behaviors such as loitering, slip and fall, crowd formation or dispersion, running and erratic behavior.

Video analytics can also be used to improve the efficiency of the IP device invention through a reduction in network bandwidth consumption. Establishing a priority for video streams based on video content analysis enables intelligent and dynamic control of video parameters for specific regions of the field of view. This will ensure high quality (high frame rate, low compression) video is available to support improved man-in-the-loop viewing (guard at monitor) and automated processing via video analytics (higher probability of correct alarm and lower false alarm). Furthermore, intelligent management of video stream size and speed will vastly improve scalability as more devices can be operated on a common network; while at the same time reduce network bandwidth consumption and video storage requirements.

For example, during a period of low or no activity an idle mode may stream low frame rate and highly compressed video of the entire wide area field of view. But when there is an event of interest, the IV may declare a priority mode and direct a high frame rate and low or no video compression stream of just the area of primary interest such as the area immediately surrounding a person as she walks bye.

Integrated EAC and CCTV IP Device with Combined EAC, IV and Application Analytics High level application analytics resident on the device data may take advantage of the complementary EAC and CCTV data and analytics to solve problems more complex than those that can be address by considering the data sets separately. Currently application analytics state of the art provides a means to combine EAC and CCTV data at the back end servers to automatically detect tailgating violations. With the multifunction IP device described herein, all the necessary hardware and software components reside on the device itself located at the network edge. For example, the state of EAC sensors as reported by the EAC Module indicates asserted identity of card and user, door location, time and duration of door open status, etc. . . . . The raw CCTV video data from the IP Video Module is passed to a Video analytics Module to compute the location, speed, direction and number of people within proximity to the door. The EAC module and the Video Analytic module together feed data to the tailgating analytics application and all work harmoniously together within the device (see Figure Seven).

Real time tailgating alert messages may be sent over the network with associated user ID from the EAC and associated video clip of tailgating event from the CCTV and IV to put all the relevant event data in a concise package.

Other analytics may be employed as well, such as association of like events over time and association of dissimilar events including loitering detection, slip and fall detection, crowd detection, and people counting. For example, a forensic analysis of the CCTV event data will produce a history of loitering events. This can be reconciled with a forensic analysis of the EAC event data and may reveal a correlation with failed access attempts indicating somebody is determined to gain unauthorized access. Finally, the loitering event history may be reconciled with tailgating event history, thereby validating suspicion that somebody was loitering in preparation for opportunity to tailgate.

Local Storage and Retrieval

While each EAC and CCTV module and associated analytic modules may have data storage capability as required to support the implementation, it is also feasible and attractive to have additional storage to provide "store and forward" flexibility on data transfer back to the central server as depicted in Figure Eight.

Integrated EAC and CCTV IP Device with Microphone, Voice over IP and Audio Analytics The device may also feature a microphone and voice over IP module so that users at the door may talk to and be heard by administrators monitoring the system. Audio signals will be conditioned for transmission over the IP infrastructure by the Voice over IP (VoIP) module. The subsystem is depicted in Figure Nine.

The audio channel will facilitate more efficient exception handling. For example, when a user is denied access at the door, an alert may automatically be generated to alert an administrator. The administrator may be presented with real time audio and video from the door in question for superb situational awareness. Furthermore, audio analytics are well suited to automatically detect sounds that may require a response. Each door equipped with this feature can be considered a listening point. Analytics may continuously monitor for loud or sudden human voices, bangs, etc. Speech recognition may be applied to recognize calls for help and other signs of distress. If two or more devices are within listening range to each other, a rough location of the sound of interest may be ascertained through analysis of signal strength, timing and other parameters.

Central Server for Real Time and Forensic Enterprise Analytics

At the security center is a central server and event database (Figure Ten). The server collects the activity from each device presented in the invention and either automatically, manually, or both organizes, associates, correlates and otherwise resolves usage trends that collectively yield insights into the enterprise. The server supports manual (man in loop) and automated (pre-defined) forensic queries through the EAC, EAC analytics metadata, CCTV, intelligent video metadata, audio, audio analytics metadata and high level analytics data. The server also facilitates construction of new real time policies to be applied to all forms of data produced by each device and from device to device throughout the enterprise.

Example of Intended Use

The device described in this invention is mounted adjacent to a secure door in an enterprise environment just as an EAC card reader would be. The device is continuously imaging the area up and down the hallway from a range of zero to about twenty feet in an Omni-directional fashion. Every event is analyzed by the video analytics and in tested against the prevailing security policy. The prevailing policy requires a statistical count of how many people walk in each direction per hour. Also, a real time alert is to be sent to the security center in the event a crowd is formed, or running or erratic behavior is detected.

Two people pass through the secure door following a single access request. The device automatically detects the event in real time by examination of the EAC data and video analytics supporting a human tailgating application. In compliance with policy, an alert is sent to the security center that contains all the relevant EAC and video data to completely capture the event. The guard's attention is brought to the event and he informs human resources. A meeting is subsequently conducted with the authorized card holder, identified by the card ID, to determine if the tailgating was complicit or inadvertent. The unauthorized user is also questioned and the two accounts corroborated. The video record makes identification of the individuals possible and repudiation difficult. Each interviewee tells the truth and pledges to adhere to the access policy.

While the invention has been shown and described with reference to specific embodiments, it should be understood by those skilled in the art that various changes in form and detail may be made therein without departing from the spirit and scope of the invention as recited in the accompanying claims.

What is claimed is:

1. A device for electronic access control and surveillance, comprising:

an electronic access control (EAC) module including a reader for reading a user's asserted identity, the EAC module controlling physical access through a portal between a secure area and a non-secure area, the EAC module generating access control data;

an imager having an integral camera for continuously surveilling an observation area proximate to the portal and generating at least one of image data and video data;

a data port disposed proximate to and electrically coupled to the EAC module and the imager, a data signal provided at the data port, the data signal comprising EAC data for the portal and at least one of the image data and video data of the continuously surveilled observation area;

an analytics module that analyzes the at least one of image data and video data to determine a number of people or objects passing through the portal and that analyzes the EAC data to determine information related to the physical access through the portal, the data signal further comprising tailgating data generated at the analytics module;

a housing having an interior region, wherein the EAC module including the reader, the imager including the integral camera, and the analytics module are co-located in the interior region of the housing at the region proximal the portal; and a power connection extending from the housing that provides power to the EAC module, the imager, and analytics module;

the EAC module including at least one sensor that reads a user's asserted identity of the EAC data and determines an open state and a closed state of the portal, the EAC module granting the physical access through the portal, the EAC module further including an input/output (I/O) module that actuates a door solenoid in response to the EAC module granting the physical access through the portal, the analytics module activated to determine the number of people or objects passing through the portal in response to the EAC module granting the physical access through the portal and in response to the EAC determining the open state of the portal and deactivated in response to the EAC determining the closed state of the portal, wherein the imager continuously surveys the observation area proximate to the portal at least prior to the I/O module actuating the door solenoid and a detection of an entry through the portal.

2. The device of claim 1 further comprising an audio surveillance module disposed proximate to and electrically coupled to the data port wherein the data signal further comprises audio data.

3. The device of claim 1 wherein the image data or the video data are formatted for transmission from the data port as Internet protocol (IP) data.

4. The device of claim 1 further comprising a digital storage module for storing at least one of EAC data, image data and video data.

5. The device of claim 1, wherein the imager shows a number of people performing the physical access through the portal, and wherein the analytics module analyzes the at least one of image data and video data and the EAC data to determine whether a tailgating violation occurred.

6. A device for electronic access control and surveillance, comprising:
an electronic access control (EAC) module including a reader for reading a user's asserted identity, the EAC module controlling physical access through a portal between a secure area and a non-secure area, the EAC module generating access control data;
an imager having an integral camera for continuously surveilling an observation area proximate to the portal and generating video data;
an analytics module in electrical communication with, and positioned under a same housing for being integrated with, at least one of the EAC module and the imager to receive at least one of access control data and the video data, respectively, and to generate metadata in response thereto; and
a data port disposed proximate to and in electrical communication with the analytics module and at least one of the EAC module and the imager, the device providing at the data port a data signal comprising the metadata from the analytics module and at least one of EAC data for the portal and video data of the continuously surveilled observation area, wherein the analytics module analyzes the video data to determine a number of people or objects passing through the portal and that analyzes the EAC data to determine information related to the physical access through the portal, the data signal further comprising tailgating data generated at the analytics module, the device further comprising:
the housing having an interior region, wherein the EAC module including the reader, the imager including the integral camera, and the analytics module are co-located in the interior region of the housing at the region proximal the portal; and
a power connection extending from the housing that provides power to the EAC module, the imager, and the analytics module;
the EAC module including at least one sensor that reads a user's asserted identity of the EAC data and determines an open state and a closed state of the portal, the EAC module granting the physical access through the portal, the EAC module further including an input/output (I/O) module that actuates a door solenoid in response to the EAC module granting the physical access through the portal, the analytics module activated to determine the number of people or objects passing through the portal in response to the EAC module granting the physical access through the portal and in response to the EAC determining the open state of the portal and deactivated in response to the EAC determining the closed state of the portal, wherein the imager continuously surveys the observation area proximate to the portal at least prior to the I/O module actuating the door solenoid and a detection of an entry through the portal.

7. The device of claim 6 further comprising an audio surveillance module disposed proximate to and being in electrical communication with the data port, the audio surveillance module generating audio data for the observation area.

8. The device of claim 7 wherein the analytics module is an audio analytics module and wherein the metadata are audio metadata.

9. The device of claim 7 wherein the data signal comprises one or more of EAC data, EAC metadata, video data, video metadata, audio data and audio metadata.

10. The device of claim 6 wherein the data signal is an Internet Protocol (IP) format signal.

11. The device of claim 6 wherein the analytics module is an EAC analytics module and wherein the metadata are EAC metadata.

12. The device of claim 6 wherein the analytics module is a video analytics module and wherein the metadata are video metadata.

13. The device of claim 6 wherein the data signal comprises one or more of EAC data, EAC metadata, video data and video metadata.

14. The device of claim 6 wherein the analytics module is an EAC analytics module in electrical communication with the EAC module and the data port, the device further comprising a video analytics module in electrical communication with the imager and the data port.

15. The device of claim 14 further comprising an applications analytic module in electrical communication with the EAC analytics module and the video analytics module, the applications analytic module providing to the data port a data signal comprising applications metadata responsive to EAC metadata generated by the EAC analytics module and video metadata generated by the video analytics module.

16. A system for electronic access control and surveillance, comprising:
a device for electronic access control and surveillance, the device comprising:
an electronic access control (EAC) module including a reader for reading a user's asserted identity, the EAC module controlling physical access through a portal between a secure area and a non-secure area, the EAC module generating access control data;
an imager having an integral camera for continuously surveilling an observation area proximate to the portal and generating at least one of image data and video data;

a data port disposed proximate to and electrically coupled to the EAC module and the imager, the device providing at the data port a data signal comprising EAC data for the portal, at least one of image data and video data of the continuously surveilled observation area, and tailgating data;

a housing having an interior region, wherein the EAC module including the reader and the imager including the integral camera are co-located in the interior region of the housing at the region proximal the portal; and a power connection extending from the housing that provides power to the EAC module and the imager;

a remote database configured for communication with the data port of the device through an intervening data network and to store the EAC data for the portal and at least one of image data and video data of the continuously surveilled observation area; and a server in communication with the remote database, the server configured to process the EAC data for the portal and at least one of image data and video data of the continuously surveilled observation area and generate analytical data in response thereto, wherein the analytical data includes data regarding a number of people or objects passing through the portal determined from the at least one of the image data and video data and includes data related to physical access through the portal determined from the EAC data, the device including a sensor that reads a user's asserted identity of the EAC data and determines an open state and a closed state of the portal, the EAC module granting the physical access through the portal, the EAC module further including an input/output (I/O) module that actuates a door solenoid in response to the EAC module granting the physical access through the portal, prior to the analytics module activated to determine the number of people or objects passing through the portal in response to the EAC module granting the physical access through the portal and in response to the EAC determining the open state of the portal and deactivated in response to the EAC determining the closed state of the portal, wherein the imager continuously surveys the observation area proximate to the portal at least prior to the I/O module actuating the door solenoid and a detection of an entry through the portal.

17. The system of claim 16 wherein the data signal comprises an Internet Protocol data signal.

18. The system of claim 16 wherein the server is configured to process the stored data in a forensic mode initiated by an operator of the server.

19. The system of claim 16 wherein the server is configured to process the analytical data in real time in response to the EAC data for the portal and at least one of image data and video data of the continuously surveilled observation area as transmitted over the intervening network.

* * * * *

UNITED STATES PATENT AND TRADEMARK OFFICE
CERTIFICATE OF CORRECTION

| | | |
|---|---|---|
| PATENT NO. | : 8,624,733 B2 | Page 1 of 1 |
| APPLICATION NO. | : 12/261201 | |
| DATED | : January 7, 2014 | |
| INVENTOR(S) | : Francis John Cusack, Jr. | |

It is certified that error appears in the above-identified patent and that said Letters Patent is hereby corrected as shown below:

In the Claims

In claim 16, column 12, line 7:

delete the words "prior to" from the phrase "prior to the analytics module activated to determine"

Signed and Sealed this
Sixth Day of May, 2014

Michelle K. Lee
*Deputy Director of the United States Patent and Trademark Office*